Oct. 23, 1945.  G. L. USSELMAN  2,387,544
FREQUENCY AND PHASE COMPARISON DETECTION AND CONTROL SYSTEM
Filed Aug. 27, 1943  4 Sheets-Sheet 1

INVENTOR
GEORGE L. USSELMAN.
BY H. S. Grover
ATTORNEY

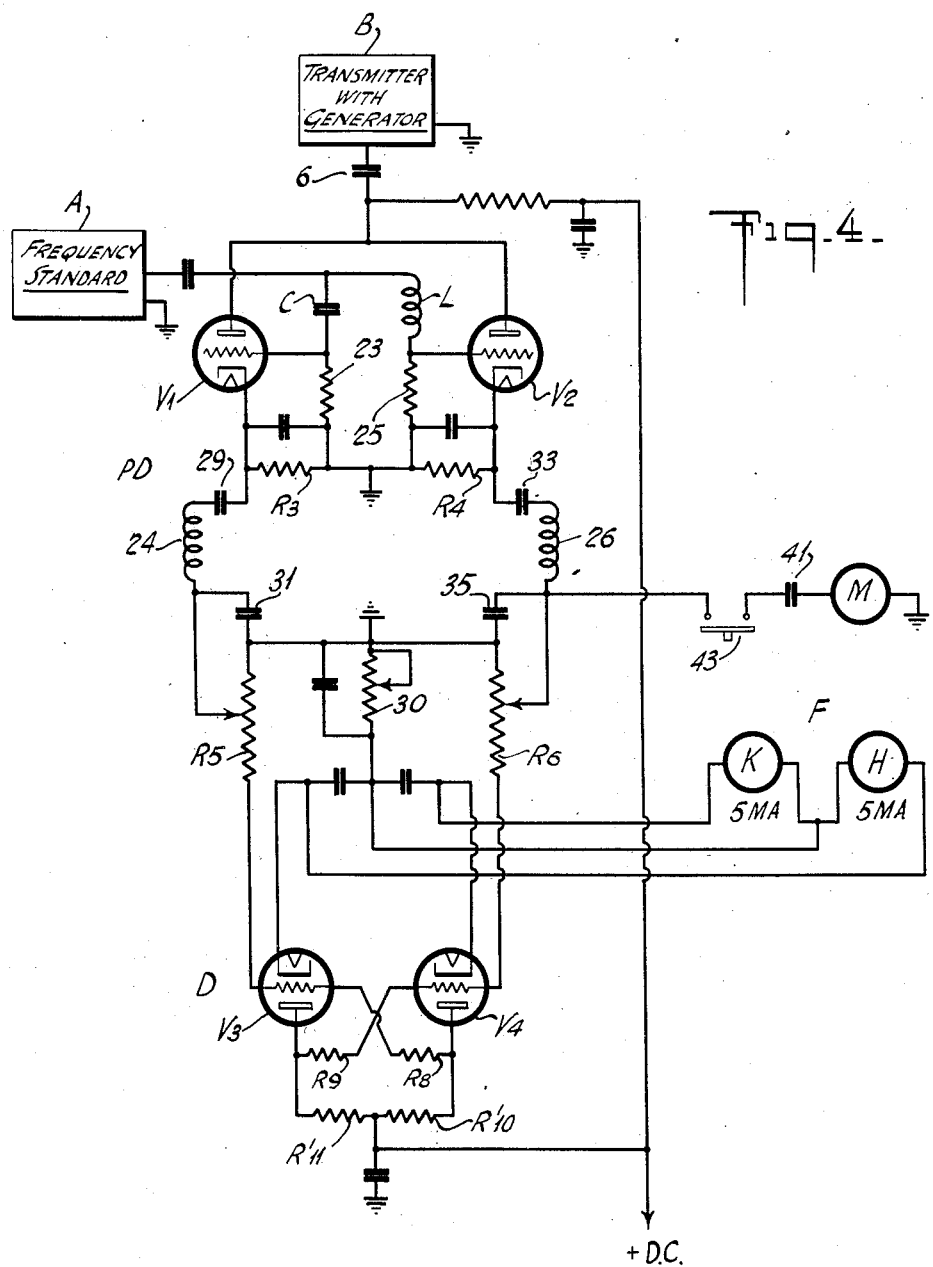

Patented Oct. 23, 1945

2,387,544

UNITED STATES PATENT OFFICE 2,387,544

FREQUENCY AND PHASE COMPARISON DETECTION AND CONTROL SYSTEM

George L. Usselman, Port Jefferson, N. Y., assignor to Radio Corporation of America, a corporation of Delaware Application August 27, 1943, Serial No. 500,191

12 Claims. (Cl. 250—40)

This application relates to improved means for controlling the frequency of wave generators and in particular to improved frequency control means of the type involved in my United States Patents #2,018,820, dated October 25, 1935, and #2,044,749, dated June 16, 1936.

More specifically, this application relates to an improved means for comparing the phases and frequencies of two alternating currents, one of which may be of fixed frequency and the other of changeable frequency such as the wave generator in a transmitter or heterodyne receiver, and for detecting phase and frequency changes of one of the wave energies with respect to the other of the wave energies and for utilizing the detected phase or frequency deviations to control the frequency of the source of oscillations the frequency of which may change.

This application also relates to improved means for inhibiting the frequency control action under certain circumstances.

An object of this invention is improved wave phase detecting and improved utilization of the detected output to control the frequency of wave energy.

Another object of the present invention is improved operation as described in the preceding paragraph, including improved means for preventing operation of the tuning control when the two frequencies being compared as to phase and frequency are related in the desired manner.

The manner in which the above objects and others are attained and the benefits derived therefrom will appear from the detailed description which follows.

In describing my invention in detail, reference will be made to the attached drawings wherein Figs. 1 to 4, inclusive, each illustrate an embodiment of my means for comparing and detecting relative phase or frequency changes of one current with respect to another current and for indicating the said changes. The embodiments of Figs. 1 to 3, inclusive, also include means for stabilizing the current of changeable frequency when the frequency relations are improper and for inhibiting the operation of such corrections when the frequency relation of the two currents is proper.

Figure 1:
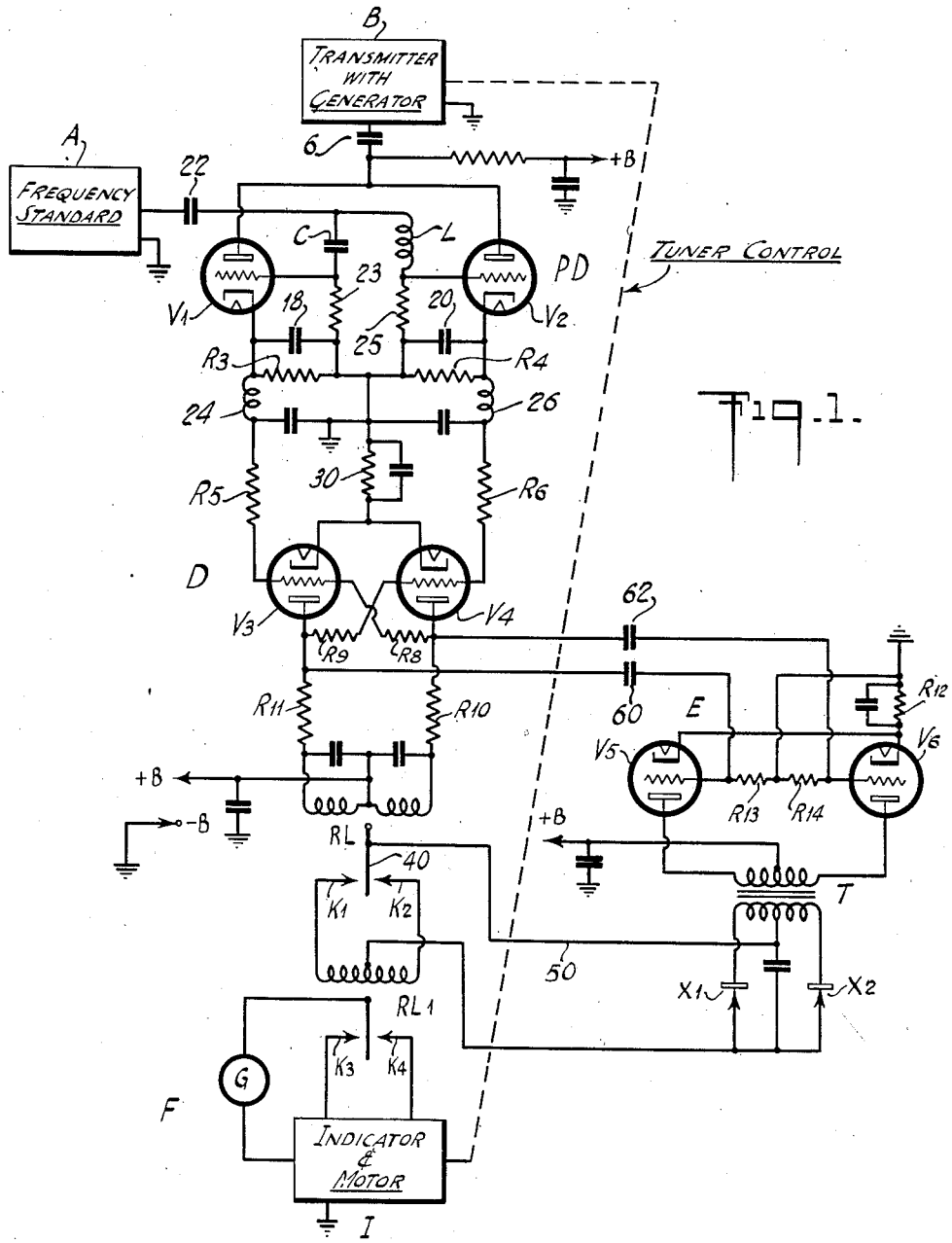

In Fig. 1, A is a source of oscillations of substantially constant frequency such as, for example, a crystal oscillator and frequency multipliers. This source is the reference source and is also referred to as the standard frequency. B is a second source of oscillations such as, for example, the generator in a transmitter or the oscillator of a heterodyne receiver.

The source B includes a tuning means which is controlled in accordance with variations between the frequency of the generated oscillations at B and the standard frequency at A. The tuning means per se may be of any approved type, and since such means is well known in the art the same is not shown in detail. It may, for example, be as illustrated in my Patents #2,018,820 and #2,044,749.

The output of the standard frequency source A and the generator in B may be of different frequencies but are preferably substantially equal so that when they are mixed a beat note is derived which may vary between say zero and 10,000 cycles per second. Some of the energy from the generator in B is impressed by coupling condenser 6 across the anodes and cathodes of two phase detector rectifiers V1 and V2 in parallel.

This radio frequency circuit runs from the generator to B to coupling condenser 6 to the anode of each tube to the cathode of each tube through the radio-frequency by-pass condensers 18 and 20, shunting cathode biasing resistances R3 and R4, respectively, and back to the generator B.

Oscillations from the standard frequency source A are impressed by coupling condenser 22 between the control grids and cathodes of the tubes V1 and V2. The control grid to cathode impedances of these circuits would likewise be substantially in parallel to the output in standard source A, except for the fact that a radio-frequency phase advancing capacity C (considered with resistance 23, tube V1 capacity, etc.) is between the grid of V1 and the coupling condenser 22, while a radio-frequency retarding reactance L (considered with resistance 25 tube V2 capacity, etc.) is between the grid of V2 and the coupling condenser 22.

In other words, the control grids of V1 and V2 are excited in phase displaced relation by oscillations from the standard frequency source A. This phase displacement may be changed as desired through a considerable angle, say 45° to 90°, but, as in the said prior patent referred to hereinbefore, it may be assumed to be about 60°.

Since the frequency to be controlled is applied to the anodes in phase, while the standard frequency is applied to the control grids in phase displaced relation, two beat notes are produced in the phase detector PD, including tubes V1 and V2. These beat notes, one of which appears across R. F. by-pass condenser 18 and resistance R3 and the other of which appears across R. F. by-pass condenser 20 and resistance R4, have a constant phase difference determined by the phase displacement produced by condenser C, resistance 23, inductance L, and resistances 25. The phase difference between the two beat notes never changes, assuming that it is set as desired by circuit element dimensions, although the frequency of the beat notes may change as the frequency of the wave generated in B shifts with respect to the frequency of the wave out of standard source A. If the frequency of the generator in B is the same as the frequency of standard source in A the beat note frequency is zero. If the frequency of the wave energy in B shifts from one side of the frequency of the source in A to the other the beat notes will reverse in phase, i. e., there will be a relative phase reversal in the beat notes each time the frequency of the wave energy in B crosses the frequency of the wave energy from the standard source in A.

The phase detector PD is in principle similar to the phase detector of the prior patents except for improvements which will be described hereinafter.

The two beat notes are fed to a tripping circuit D of the type disclosed in Finch United States Patent #1,844,950, and they are used to produce control currents and/or indications of the relative phases of the beat notes, and of the frequency thereof. This latter indication is also an indication of the frequency of the current out of B.

The cathode of tube V1 is coupled by resistance R5 and a radio-frequency filtering circuit including stopping inductance 24 to the control grid of tube V3, while the cathode of tube V2 is coupled by resistance R6 and the radio frequency filter including stopping inductance 26 to the control grid of tube V4. The cathodes of tubes V3 and V4 are connected to the low beat note potential ends of resistances R3 and R4 and to ground by a by-passed cathode bias resistance 30 so that the potentials of beat note frequency developed across R3 and R4 are fed to the grids of tubes V3 and V4.

It will be noted that in this tripping circuit the anode of tube V4 is coupled by a resistance R10 to one winding of a relay RL, the second winding of relay RL and resistance R11 is connected to the anode of V3, while the control grids of tube V3 and V4 are respectively cross coupled by resistances R8 and R9 to the anodes of tubes V4 and V3. Thus an increase of current through the tube, say V3, produces in R11 a potential drop which is instantly communicated by R9 to the control grid of V4 to bias the same more negative and reduce the current in V4 to thereby switch substantially full current to tube V3 and reduce current in tube V4. Conversely, an increase in the current through V4 will act through R10 and R8 to switch full current to V4 and lower the current in V3.

The grids of the tubes are, as stated above, each excited by a beat note from the phase detectors V1 and V2 and these beat notes are of a phase which relatively reverses as the frequency of B passes through the frequency of A and also of a phase rotation the direction of which depends upon whether the frequency of the generator in B is greater or less than that of the standard frequency of the source in A.

As pointed out in said prior patents the phase relation between these two beat notes determines which of the tubes V3 and V4 will start to draw current to thereby reduce current through the other tube, when the tubes are properly biased to a point at which this desired tripping action takes place, and when the beat notes are applied as shown to the control grids of tubes V3 and V4.

The tripping circuit including the tubes V3 and V4 will be actuated by the beat oscillations delivered from the cathodes of the detector tubes V1 and V2. In the tripping circuit only one side or tube carries current at one time. For example, if the frequency of the wave energy from B is lower than that from A, detector tube V1 will provide the beat note of leading phase, and will trip the tube V3 of the tripping circuit. Tube V3 will then carry current during a time equivalent to, say 60° of a cycle of the beat note. Then detector tube V2 trips tube V4 so that this side of the tripping circuit carries current during a time equivalent to 300° of the beat note cycle before tube V3 is again tripped. Consequently, the relay K armature 40 will be pulled, say to the right because more average direct current now flows through the right hand winding of RL to tube V4 than flows through the left hand winding of RL to tube V3. Now, by similar sequence, if the frequency output from unit B is higher than that from unit A detector tube V2, wherein the beat note of leading phase appears, will trip the tube V4 side of the tripping circuit so that this tube takes the current for the shortest time (60° of the beat note cycle) and then the other side of the tripping circuit, i. e., tube V3 will carry current for the longest time (300° of the beat note cycle), and, consequently, V3 will carry the more average direct current and relay K armature 40 will be pulled to the left.

Stated in another way, suppose that the phase shifters C and L were such as to produce 180° or phase opposed relation between the beat notes fed from tubes V1 and V2 to the tripping circuit. Then the two sides of the tripping circuit each draws current about one-half the beat note cycle and their average currents are equal, and the armature of K will remain in the neutral position. This is because one side is excited by the leading beat note and current is tripped to that one side for half a cycle at which time the beat note of lagging phase excites the other side of the tube and current is then tripped to the other side for half a cycle of the beat note. However, here the phase displacement is, say 60°, so that the beat note of leading phase trips the current to one side and it flows in that side during $^{60}/_{360}$ of a cycle of the beat note frequency at which time the note of lagging phase acts on the other side to trip the current to the other side where it stays for $^{300}/_{360}$ of a cycle of the beat note so that the average current through the said other side is the greater. This has been fully explained in my Patents No. 2,018,820 and No. 2,044,749.

The relay 40 is prevented from oscillating, due to the alternate pulses of current through its winding, by the large by-pass condensers shunting these windings. Electrolytic type of condensers are best for this purpose because large capacity can be obtained in a small volume. Where the beat note frequency is low the relay may oscillate slowly or stay on one side. In this case the inhibitor tubes V5 and V6 will function to render the relay circuits ineffective.

In general the relay 40 responds to the average currents in its windings because the pulses are filtered out. Since the current on the two sides are unbalanced the relay tongue will be pulled to one or the other side.

The armature 40 of RL closes one or the other of two contacts K1 and K2. The contacts K1 and K2, whichever is closed, complete a circuit 50 through a source of potential which will be described hereinafter to energize one or the other winding of a second relay RL1, the armature of which cooperates with contacts K3 and K4 to close a circuit in one direction or another through a motor and/or an indicator in I to indicate whether the frequency of the generator in B is above or below the frequency of the standard source in A and/or to drive a motor in one or the other direction to retune the generator in B to bring it back to a frequency equal to the frequency of the standard source in A, so that zero beat notes are obtained in the output of the phase detectors V1 and V2.

The circuit 50 might include a direct current source such as a battery or rectifier, if operation of the meter in I or of the tuning motor without the tuning inhibiting means mentioned above coming into play when the oscillations from B and A are of the same frequency, is desired. I provide means to stop operation of the tuning means when the two frequencies are equal. To do this I use two rectifiers X1 and X2 in circuit with the secondary winding of the transformer T, the primary winding of which is coupled to the anodes of a pair of amplifiers V5 and V6 which for grid excitation are coupled by coupling condensers 60 and 62 to the anodes of the tripping tubes V3 and V4. These tubes V5 and V6 have a common cathode bias resistance R12 and grid leak resistances R13 and R14 respectively. The beat notes when present are amplified in tubes V5 and V6 rectified at X1 and X2 the rectified current being supplied to the windings of RL1 to be effective only in the event that the said beat note has tripped D to one side or the other.

In other words, the operating source for the circuit 50, completed by the armature 40 of relay RL, is derived from the beat notes out of the phase detectors V1 and V2 as amplified in tubes V3 and V4 and appearing across impedances R10 and R11.

The beat notes are impressed by coupling condensers 60 and 62 on the grids of amplifier tubes V5 and V6. When the frequency of B is the same as the frequency of A the beat notes in V3 and V4 are zero, and no alternating current energy is fed to the amplifier of V5 and V6 to be rectified in X1 and X2 and supply current to the circuit 50. Thus when the system is in tune there are no beat notes, i. e., the beat notes are of zero frequency and the tuning apparatus in I is inoperative to cause tuning of the transmitter in B, and hunting in the system is prevented.

As stated above, when the frequency of the generator in B is different from the frequency in the source A beat notes are impressed on the tripping tubes appear across the resistances R10 and R11, are fed by the coupling condensers 60 and 62 to the amplifiers V5 and V6, are rectified in X1 and X2 to supply operating potential for the circuit 50 and one or the other windings of the relay RL1. The motor or indicator in I is supplied by potential from a source G which may represent a battery or generator, etc.

The motor may be A. C. or D. C. which will reverse its rotation when the relay RL1 changes to the other contact.

Lamps or meters or other suitable devices may be used to indicate whether the transmitter frequency is above or below the standard. Arrangements could be made to indicate when the transmitter is on exact frequency.

Figure 2:
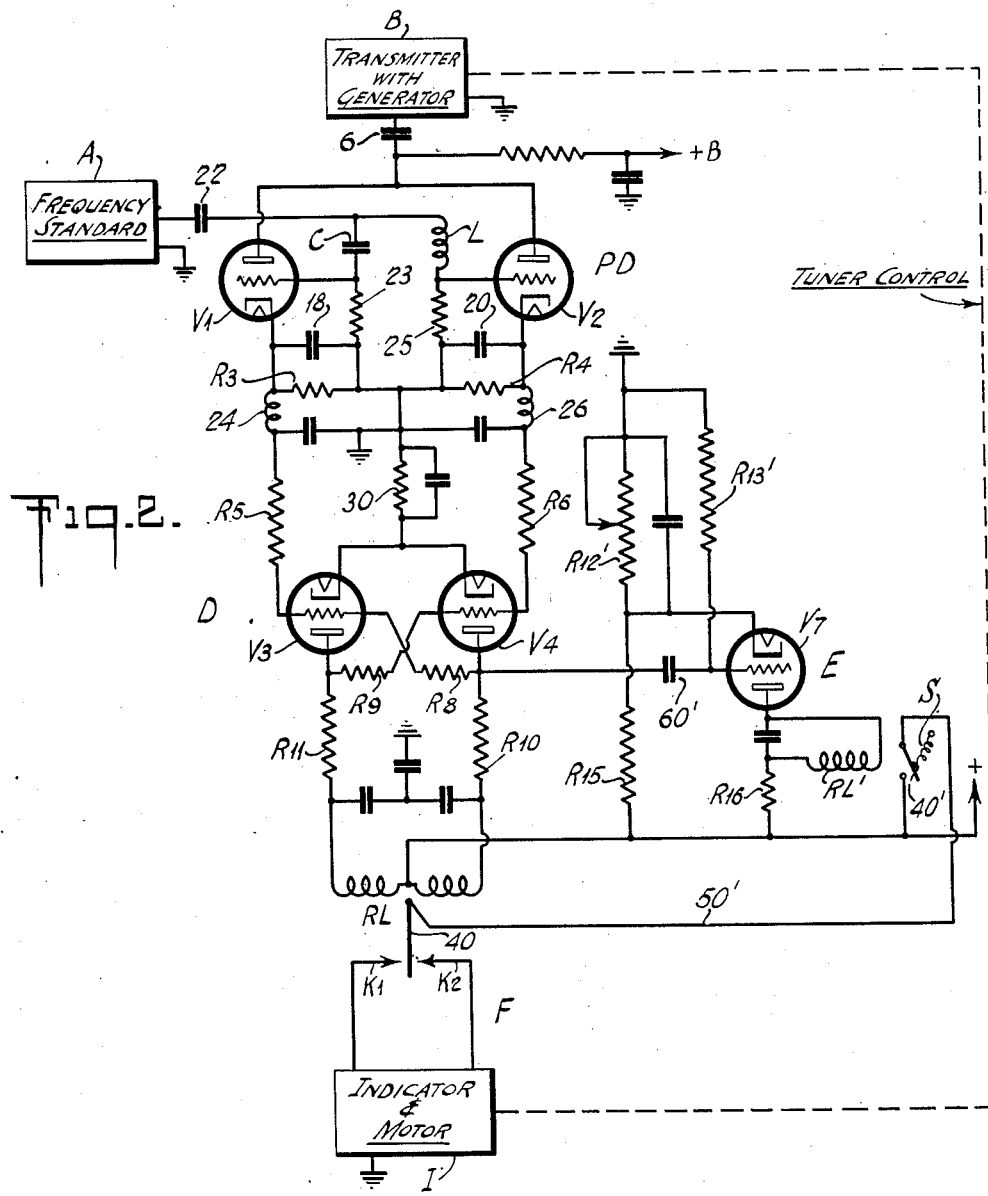

In the arrangement of Fig. 1 tubes V5 and V6 amplify the beat notes for the rectifiers X1 and X2. In the arrangement of Fig. 2 the amplifiers V5 and V6 have been omitted as have the rectifiers X1 and X2. The functions of these tubes is carried out in the single tube V7 in Fig. 2. The tube V7 has its control grid coupled by a condenser 60' to the anode of one of the tubes V3 or V4 and its cathode connected to ground by a resistance R12', in a bleeder circuit including resistance R15, and its grid coupled to ground by a resistance R13'. In the modified form illustrated in Fig. 2 the relay RL operates directly on the indicator and/or motor in I. The anode of tube V7 is coupled to the winding of a relay RL' the armature 40' of which is in a direct current supply connection 50' between a source of direct current and the armature 40 of the relay RL.

In the modification illustrated in Fig. 2 the cathode bias potentiometer R12' is adjusted for cut-off of current in tube V7 when no excitation is present, that is when the two frequencies at A and B are alike and zero beat note is supplied to the tripping circuit D. Tube V7 passes current as long as the tripping circuit is being supplied a beat note sufficient to actuate the same. This keeps relay RL' armature 40' closed and thereby supplies current to the armature 40 of relay RL and thence to the indicator or one of the motor windings in F. Thus as in Fig. 1 the frequency of the generator in B is adjusted until zero beat note is obtained in the output of the detectors V1 and V2. If the generator in B is on frequency that is in synchronism with the output of A the detector beat note is substantially zero and the tripping circuit D locks in one position. Since no excitation is reaching the inhibitor tube V7, it being biased to cut-off, passes no current and consequently relay RL' is opened by spring S and no further correction can take place until the beat note is again present. The direction of correction is such as to bring the frequencies of the transmitter generator and the source A toward each other. The direction of tuning can be made as desired by the proper connection of the motor windings in I to the contacts K1 and K2 associated with the relay RL of Figs. 1 and 2 or the contacts K3 K4 associated with the relay RL1 of Fig. 1.

Figure 3:
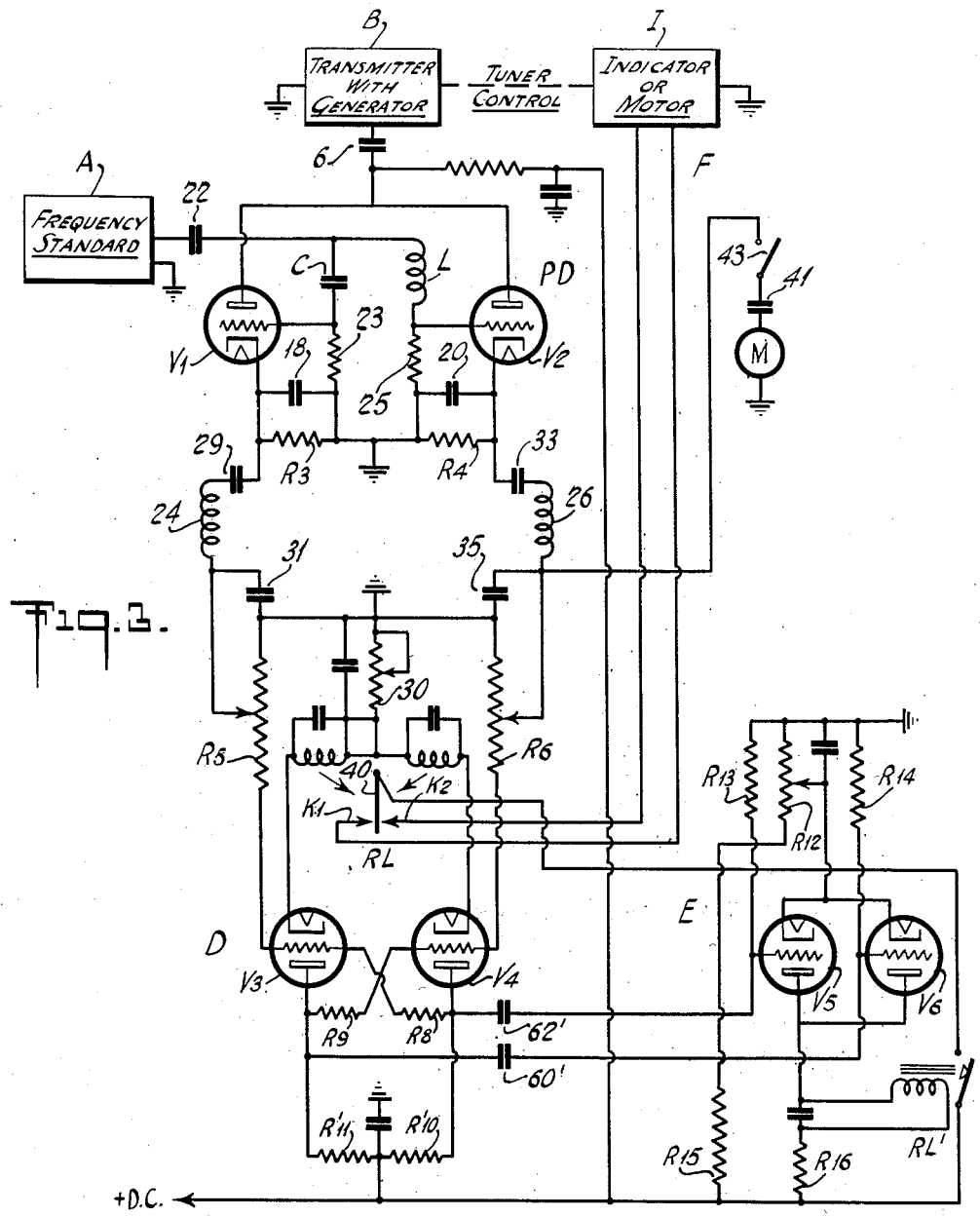

In the arrangement of Fig. 3 the relay RL has been included in the cathode return circuits of tubes V3 and V4 instead of in the anode circuits thereof as in Figs. 1 and 2. The relay in this position gives several advantages. For example in Fig. 1 the relay RL must carry in addition to the tube current of tubes V3 and V4 the steady current passing through resistors R10, R8 and R5 and through resistors R11, R9 and R6. This makes the relay differential current smaller in comparison to the relay differential current available in the arrangement of Fig. 3. In Fig. 3 the relay RL carries only the tube currents of tripping tubes V3 and V4. Consequently the differential current is 100% and the relay is much faster acting.

An additional advantage derived from the modification in Fig. 3 is that the relay RL connected in the cathode return circuit is subject to a much lower steady direct current voltage than it is in the anode circuit of Fig. 1 and in my previous arrangements disclosed in the above identified patents.

An additional feature of the arrangement of Fig. 3 is in the coupling of the phase detector PD to the tripping circuit D. In Fig. 3 the cathodes of the detector tubes V1 and V2 are coupled to the grids of the tripping circuit tubes V3 and V4 through filters comprising condensers 29 inductance 24 and condenser 31 and condenser 33, inductance 26 and condenser 35 and through potentiometer resistances R5 and R6. In these filters condensers 29 and 33 are large capacity direct current blocking condensers used only for conducting alternating current power. Condensers 31 and 35 are the filter condensers. These filters are low pass as they attenuate the transmitter frequency but pass the beat note and variations of beat frequency. The purpose of using these two filters is to prevent the high frequency and the direct current power from reaching the tripping circuit D. The high frequencies might blur the tripping action and the direct current bias of tubes V1 and V2 may interfere in some cases with the sensitive operation of the tripping circuit.

The rectifying type A. C. meter M connected across the output of one filter is capable of operating on a very small power such as the usual type volume indicators and this meter operates through condenser 41 and switch 43 to show on its scale, calibrated in cycles, the frequency of the beat note at the output of the phase detectors. Due to the condenser 41 the meter will read zero at zero beat and it will increase up the scale as the beat frequency is increased. This indicates how far off the transmitter frequency is and thereby also indicates the transmitter frequency since the frequency of the current out of A is known.

The preferred inhibitor circuit E in this figure has features substantially as illustrated in Figs. 1 and 2. In Fig. 3 two tubes V5 and V6 are used to rectify the beat note out of the tripping circuit to supply more current to operate the inhibitor relay RL'.

The inhibitor circuits shown in Figs. 1, 2 and 3 have an advantage over those of my previous patents in that they are much simpler in construction and operation. They also operate at all the tripping frequencies down to substantially zero beat. Tubes V5 and V6 and V7 are excited through blocking condensers 60 and 62 and 60' and 62' from the tripping circuit when it is producing alternating currents effects due to the beat frequency from phase rotation detector PD. When the beat frequency is substantially zero the tripping circuit is locked in one position or the other. Ordinarily this would operate relay RL to over-correct the transmitter frequency and cause hunting or continuous operation of the tuning apparatus. However, when zero beat is reached in these modifications no excitation voltages are supplied to the amplifiers or rectifiers V5 and V6 and V7 and these tubes do not function so that no current is supplied to the contacts associated with the armature of relay RL or relay RL' and frequency correction is stopped instantly.

The relay RL being a polarized type of relay usually has a permanent magnet in its construction. It is suggested that the current from inhibitor tubes V5 and V6 could supply current to the coils of an electric polarizing magnet in relay RL and thus eliminate the use of relay RL'. In the case of zero beat no current would be supplied to the magnet coils and the relay RL would be inoperative until a beat note appeared again.

In some cases it is desirable to use my improved frequency comparison phase detection and tripping system for frequency indication purposes only. In the embodiment illustrated in Fig. 4 the tuning control mechanism and relay RL therefore and the inhibiting circuit have been omitted. Fig. 4 is in many respects similar to the arrangement of Fig. 3. Two milliammeters K and H are connected differentially in the cathode return circuits of the tripping tubes V3 and V4.

In operation in the presence of beat notes, that is when the generator in B is not at the correct frequency, the ammeters K and H will indicate whether the transmitter generator frequency is above or below the frequency of the standard source. If the operator sees meter K reading high and meter H reading low this indicates that the transmitter frequency is below standard. If he sees meter H reading high and meter K reading low it indicates that the transmitter is above standard frequency. Meter K indicates that source B is below standard frequency when the reading is up and meter H indicates the transmitter generator B is above normal frequency when its reading is up. This results from the fact that as the generator frequency from B passes through zero beat note with respect to the output of A the beat frequencies reverse direction of rotation thereby tripping the circuit D and changing the amount of current flowing in the respective meters K and H differentially connected in the cathode return circuits of the tripping tubes in the same way that the current changes in the windings of relay RL of Fig. 3. The meter M indicates as in Fig. 3 the cycles off frequency when the switch 43 is closed. By observing meters K and H and by pushing switch 43 the operator may determine how far the transmitter frequency is off and in which direction. If the transmitter frequency is at zero beat with the standard frequency either K or H may give readings but meter M will read zero.

With respect to Figs. 3 and 4 it will be noted that potentiometers R5 and R6 are part of the tripping circuit and are also used to adjust the excitation from the detector stage to the grids of the tubes V3 and V4 in the tripping circuit. This permits adjustments to obtain balanced operation of the tripping circuit even if the phase detector including tubes V1 and V2 happen to be somewhat unbalanced due to the dissimilarity in tube characteristics, circuit elements, etc.

What I claim is:

1. In apparatus of the class described, a source of oscillations the frequency of which may vary, a source of oscillations of substantially like frequency which is of substantially fixed frequency, a phase rotation detector including two tubes each having input electrodes including a cathode and having output electrodes including said cathode, circuits for impressing oscillations from both of said sources on electrodes of both of said tubes there being a phase displacement between the oscillations impressed from one of said sources on the electrodes of the respective tubes, a tripping circuit comprising a pair of tubes each having an anode, a cathode and a control grid with the anodes and grids of the last mentioned tubes cross-coupled by impedances, couplings between the control grids of said second named pair of tubes and the cathodes of said first named pair of tubes and a utilization circuit differentially coupled to corresponding electrodes in said second pair of tubes.

2. In apparatus of the class described, a source of oscillations the frequency of which may vary, a source of oscillations of substantially the same frequency which source is of substantially fixed frequency, a phase rotation detector including two tubes each having input electrodes including a cathode and having output electrodes including said cathode, circuits for impressing oscillations from both of said sources on electrodes of both of said tubes there being a phase displacement between the oscillations impressed from one of said sources on the electrodes of the respective tubes, a tripping circuit comprising a pair of tubes each having an anode, a cathode and a control grid with the anodes and grids of the last mentioned tubes cross-coupled by impedances, filter circuits coupling the control grids of said second named pair of tubes to the cathodes of said first named pair of tubes and a utilization circuit differentially connected to corresponding electrodes in said second pair of tubes.

3. In apparatus of the class described, a source of oscillations the frequency of which may vary, a source of oscillations of substantially the same frequency which source is of substantially fixed frequency, a phase rotation detector including two tubes each having input electrodes including a cathode and having output electrodes including said cathode, circuits for impressing oscillations from both of said sources on electrodes of both of said tubes there being a phase displacement between the oscillations impressed from one of said sources on the electrodes of the respective tubes, a tripping circuit comprising a pair of tubes each having an anode, a cathode and a control grid with the anodes and grids of the last mentioned tubes cross-coupled by impedances, couplings between the control grids of said second named pair of tubes and the cathodes of said first named pair of tubes and a utilization circuit differentially connected between the anodes of said second pair of tubes.

4. In apparatus of the class described, a source of oscillations the frequency of which may vary, a source of oscillations of substantially like frequency which source is of substantially fixed frequency, a phase rotation detector including two tubes each having input electrodes including a cathode and having output electrodes including said cathode, circuits for impressing oscillations from both of said sources on electrodes of both of said tubes there being a phase displacement between the oscillations impressed from one of said sources on the electrodes of the respective tubes, a tripping circuit comprising a pair of tubes each having an anode, a cathode and a control grid with the anodes and grids of the last mentioned tubes cross-coupled by impedances, couplings between the control grids of said second named pair of tubes and the output electrodes of said first named pair of tubes and a utilization circuit differentially coupled between the cathodes of said second pair of tubes.

5. In apparatus of the class described, a source of oscillations the frequency of which may vary, a source of oscillations of substantially the same frequency which source is of substantially fixed frequency, a phase rotation detector including two tubes each having input electrodes including a cathode and having output electrodes including said cathode, circuits for impressing oscillations from both of said sources on electrodes of both of said tubes there being a phase displacement between the oscillations impressed from one of said sources on the electrodes of the respective tubes, a tripping circuit comprising a pair of tubes each having an anode, a cathode and a control grid with the anodes and grids of the last mentioned tubes cross-coupled by impedances, low pass filters coupling the control grids of said second named pair of tubes to the cathodes of said first named pair of tubes and a utilization circuit differentially connected to corresponding electrodes in said second pair of tubes.

6. In apparatus of the class described, a source of oscillations the frequency of which may vary, a source of oscillations of substantially the same frequency which source is of substantially fixed frequency, a phase rotation detector including two tubes each having input electrodes including a cathode and having output electrodes including said cathode, circuits for impressing oscillations from both of said sources on electrodes of both of said tubes there being a phase displacement between the oscillations impressed from one of said sources on the electrodes of the respective tubes, a tripping circuit comprising a pair of tubes each having an anode, a cathode and a control grid with the anodes and grids of the last mentioned tubes cross-coupled by impedances, couplings between the control grids of said second named pair of tubes and the output electrodes of said first named pair of tubes, a relay circuit differentially connected between corresponding electrodes in said second pair of tubes said relay circuit comprising a pair of windings differentially associated with a contact operating armature, a control circuit including another contact associated with the contact operated by said armature, and a source of current for said control circuit including a rectifier system coupled at its input to an electrode of at least one of said second named pair of tubes.

7. In apparatus of the class described, means for producing two phase displaced beat notes of like frequency the directions of rotation of which reverse and the frequency of which may vary from zero frequency to several thousand cycles per second, a tripping circuit comprising a pair of tubes each having an anode, a cathode and a control grid with the anodes and grids of the last mentioned tubes cross-coupled by impedances, couplings for impressing one of said beat notes on the control grid of one tube and the other of said beat notes on the control grid of the other tube, and a utilization circuit coupled between the cathodes of said tubes.

8. In apparatus of the class described, a phase detector for deriving from two currents of substantially like frequency one of which may vary in frequency, two beat notes of zero frequency when the currents are of like frequency and of a phase relation which reverses as the frequency of said one current passes through the frequency of the other current, a tripping circuit comprising a pair of tubes each having an anode, a cathode and a control grid with the anodes and grids of the said tubes cross-coupled by impedances, couplings between said phase detector and said tubes for impressing one of said beat notes on the control grid of one tube and the other beat note on the control grid of the other tube, a relay circuit differentially connected between corresponding electrodes of said tubes said relay circuit comprising a pair of windings differentially associated with a contact operating armature, a control circuit including another contact associated with the contact operated by said armature, and a source of current for said control circuit including a rectifier system coupled at its input to an electrode of at least one tube of said pair of tubes.

9. In a system of the class described, a phase rotation detector wherein phase displaced beat notes of like frequency the direction of rotation of which reverses and the frequency of which may vary from zero to several thousand cycles are produced, a pair of electron discharge devices having input and output electrodes and having their input and output electrodes cross-connected by impedances, a filter for impressing one beat note on the control grid of one tube, a filter for impressing the other beat note on the control grid of the other tube, a relay comprising windings differentially connected between corresponding electrodes of said tubes, an armature associated with said windings, a contact, an operating circuit including said armature and contact, and means excited by beat note energy for supplying direct current for said operating circuit.

10. In apparatus of the class described, a phase detector for deriving from two currents of substantially like frequency one of which may vary in frequency, two beat notes of zero frequency when the currents are of like frequency and of a phase relation which reverses as the frequency of said one current passes through the frequency of the other current, a tripping circuit comprising a pair of tubes each having an anode, a cathode and a control grid with the anodes and grids of the last mentioned tubes cross-coupled by impedances, couplings between said phase detector and said tubes for impressing one of said beat notes on an electrode of one tube and the other beat note on an electrode of the other tube, a relay circuit differentially connected between the cathode electrodes of said tubes, said relay circuit comprising a pair of windings differentially associated with an armature, a contact which is moved by said armature when operated from one to the other of two positions, a switch having one contact connected to said first mentioned contact and having another contact to be connected to a source of direct current, control circuits including two additional contacts arranged to be alternatively closed by the contact operated by said armature, and a relay excited by beat note energy for closing said switch.

11. In apparatus of the class described, a phase detector for deriving from two currents of substantially like frequency one of which may vary in frequency, two beat notes of zero frequency when the currents are of like frequency and of a phase relation which reverses as the frequency of said one current passes through the frequency of the other current, a tripping circuit comprising a pair of tubes each having an anode, a cathode and a control grid with the anodes and grids of the last mentioned tubes cross-coupled by impedances, couplings between said phase detector and said tubes for impressing one of said beat notes on the control grid of one tube and the other beat note on the control grid of the other tube, relay windings differentially connected between corresponding electrodes of said tubes, a contact closing armature associated with said windings to be moved in one position when one winding is excited and to a second position when the other winding is excited, a second relay comprising a winding having one terminal connected to a contact closed by said armature in one position and having its other terminal connected to a contact closed by said armature in its second position, a rectifier system excited by beat note energy, said rectifier system having two direct current supply terminals, a coupling between one supply terminal and said first mentioned armature, a coupling between the other supply terminal and a point on said second winding, and a utilization circuit controlled by said second relay.

12. In apparatus of the class described, a phase detector for deriving from two currents of substantially like frequency one of which may vary in frequency, two beat notes of zero frequency when the currents are of like frequency and of a phase relation which reverses as the frequency of said one current passes through the frequency of the other current, a tripping circuit comprising a pair of tubes each having an anode, a cathode and a control grid with the anodes and grids of the last mentioned tubes cross-coupled by impedances, couplings between said phase detector and said tubes for impressing one of said beat notes on the control grid of one tube and the other beat note on the control grid of the other tube, a relay circuit differentially connected between corresponding electrodes of said tubes, said relay circuit comprising a pair of windings and a contact closing armature arranged to be moved to a first position when one winding is energized and to a second position when the other winding is energized, a utilization circuit having two branches, one terminating in a contact in said one position and the other branch terminating in a contact in said second position, a switch for connecting a source of direct current to said armature, a relay winding associated with said switch, and an electron discharge device having input electrodes excited by beat note energy when the said two currents are of unlike frequency, said discharge device having output electrodes connected to said last mentioned relay winding.

GEORGE L. USSELMAN.